(12) United States Patent
Shrivastava et al.

(10) Patent No.: US 7,702,758 B2
(45) Date of Patent: Apr. 20, 2010

(54) METHOD AND APPARATUS FOR SECURELY DEPLOYING AND MANAGING APPLICATIONS IN A DISTRIBUTED COMPUTING INFRASTRUCTURE

(75) Inventors: Saurabh Shrivastava, Fremont, CA (US); Stephen Man Leung Lee, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1041 days.

(21) Appl. No.: 10/993,973

(22) Filed: Nov. 18, 2004

(65) Prior Publication Data
US 2006/0117390 A1 Jun. 1, 2006

(51) Int. Cl.
*G06F 15/177* (2006.01)
(52) U.S. Cl. .................................... 709/220
(58) Field of Classification Search .................. 709/220
See application file for complete search history.

(56) References Cited

U.S. PATENT DOCUMENTS

| 6,161,139 | A  | * | 12/2000 | Win et al. ................. | 709/225 |
| 7,131,000 | B2 | * | 10/2006 | Bradee ...................... | 713/164 |
| 7,310,677 | B1 | * | 12/2007 | Cohen et al. ............... | 709/229 |
| 2001/0047485 | A1 | * | 11/2001 | Brown et al. .............. | 713/201 |
| 2002/0095395 | A1 | * | 7/2002 | Larson et al. ............. | 706/47 |
| 2003/0126137 | A1 | * | 7/2003 | McFadden ................. | 707/100 |
| 2003/0229623 | A1 | * | 12/2003 | Chang et al. .............. | 707/3 |
| 2004/0181539 | A1 | * | 9/2004 | Munson et al. ............ | 707/100 |
| 2004/0193917 | A1 | * | 9/2004 | Drews ....................... | 713/201 |
| 2005/0193196 | A1 | * | 9/2005 | Huang et al. .............. | 713/166 |

* cited by examiner

*Primary Examiner*—John Follansbee
*Assistant Examiner*—Alan S Chou
(74) *Attorney, Agent, or Firm*—Park, Vaughan & Fleming LLP

(57) ABSTRACT

One embodiment of the present invention provides a system that allows secure deployment delegation and management of applications in a distributed-computing infrastructure. During operation, the system assigns a deployment-role to a user, which enables the user to deploy an application in the distributed-computing infrastructure. Moreover, by assigning the deployment-role to the user, the system also delegates the privilege to assign a run-time-role to the application. Note that the set of run-time roles a user is allowed to assign (or grant) can depend on the deployment role that has been assigned to the user. Furthermore, assigning the run-time-role to the application grants permission to the application to access a resource in the shared infrastructure, which allows the application to operate properly. Furthermore, note that by delegating to users the privilege of assigning roles to applications simplifies the secure deployment and management of applications in the distributed-computing infrastructure.

21 Claims, 3 Drawing Sheets

METHOD AND APPARATUS FOR SECURELY DEPLOYING AND MANAGING APPLICATIONS IN A DISTRIBUTED COMPUTING INFRASTRUCTURE

BACKGROUND

1. Field of the Invention

The present invention relates to distributed computer systems. More specifically, the present invention relates to a method and apparatus for securely deploying and managing applications in a distributed-computing infrastructure.

2. Related Art

Distributed computing is widely expected to reduce costs and increase efficiencies by revolutionizing the way in which enterprises use and manage resources in their IT (Information Technology) infrastructure. A distributed-computing environment (or infrastructure), such as a grid-computing infrastructure, usually treats resources as virtualized services, thereby optimizing resource utilization.

Enterprises usually centralize security and identity management functions through a shared infrastructure. Unfortunately, existing implementations of shared infrastructures are complex and proprietary due to the lack of a consistent enterprise-wide delegation model.

Specifically, enterprises are typically subdivided into smaller groups. Usually, each of these groups has its own IT infrastructure. Typically, applications (or components) are installed (or deployed) in a group by a local administrator. Note that in order to install an application, different local administrators typically require different privilege levels in the shared infrastructure. Moreover, during run-time, different applications also typically require different privilege levels to access the shared infrastructure.

This creates two problems. First, the administrators of the shared infrastructure must trust the application installers enough to grant them high privilege levels to install applications. In a large enterprise, this may lead to a large number of installers who have high privilege levels, which is undesirable for obvious security reasons. Consequently, this makes it very difficult to delegate deployment responsibility in a secure manner. Second, granting high privilege levels to applications is also undesirable, because a high privilege level can allow a malfunctioning application to corrupt shared data or expose information that should not be accessible to other applications.

Hence, what is needed is a method and apparatus to securely delegate privileges, thereby enabling secure deployment and management of applications in a distributed-computing infrastructure without the problems described above.

SUMMARY

One embodiment of the present invention provides a system that allows secure deployment delegation and management of applications in a distributed-computing infrastructure. During operation, the system assigns a deployment-role to a user, which enables the user to deploy an application in the distributed-computing infrastructure. Moreover, by assigning the deployment-role to the user, the system also delegates the privilege to assign a run-time-role to the application. Note that the set of run-time roles a user is allowed to assign (or grant) can depend on the deployment role that has been assigned to the user. Furthermore, assigning the run-time-role to the application grants permission to the application to access a resource in the shared infrastructure, which allows the application to operate properly. Furthermore, note that by delegating to users the privilege of assigning roles to applications simplifies the secure deployment and management of applications in the distributed-computing infrastructure.

In a variation on this embodiment, the system assigns a deployment-role-owner role to a role-owning-user, which delegates to the role-owning-user the privilege of assigning the deployment-role to other users.

In a variation on this embodiment, the system assigns an admin-role to an admin-user, which enables the admin-user to administer user information and application security policies. This includes altering or querying (e.g., creating, deleting, and editing) sensitive information, such as user attributes, user preferences, and application security policies.

In a variation on this embodiment, the system assigns a deployment role to a user for a limited duration only, wherein the role and associated privileges are revoked after the limited duration is over.

In a variation on this embodiment, the system assigns a role-owner role that is based on an assignable-role to a role-owning-user, which enables the role-owning-user to assign the assignable-role to users.

In a variation on this embodiment, the system includes a centralized repository that maintains the assignment of roles to users and applications.

In a further variation on this embodiment, the centralized repository uses LDAP (Lightweight Directory Access Protocol) directory service.

Table 1 presents exemplary deployment roles and their privileges.

Table 2 presents exemplary run-time roles and their associated permissions.

Table 3 presents exemplary admin roles and their privileges.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Distributed-Computing Infrastructure

A large enterprise is typically subdivided into smaller groups, such as a marketing group, an engineering group, a financial group, etc. Each of these groups has its own computing infrastructure, which collectively create a distributed computing environment (or infrastructure) that can result in an inefficient use of resources.

Distributed computing solves these problems by providing an enterprise-wide shared (or common) infrastructure that makes efficient use of computing resources. Specifically, a distributed-computing infrastructure, such as a grid-computing infrastructure, treats all of the resources in the infrastructure as virtualized services, thereby optimizing resource utilization.

In a distributed-computing infrastructure, applications (or components) are typically deployed in a group by the local administrator. Note that, although these applications are deployed in a distributed manner, they typically share common information. For example, many applications share a common notion of a user. Moreover, note that a user's profile and preferences can either be shared between applications or be specific to each application. In either case, this information may be stored in the shared infrastructure.

In one embodiment of the present invention, applications use a shared infrastructure, such as a LDAP directory server, to store shared information, such as user profiles and preferences. In another embodiment of the present invention, applications store common information using OID (Oracle Internet Directory) which uses LDAP (Lightweight Directory Access Protocol).

Figure 1:
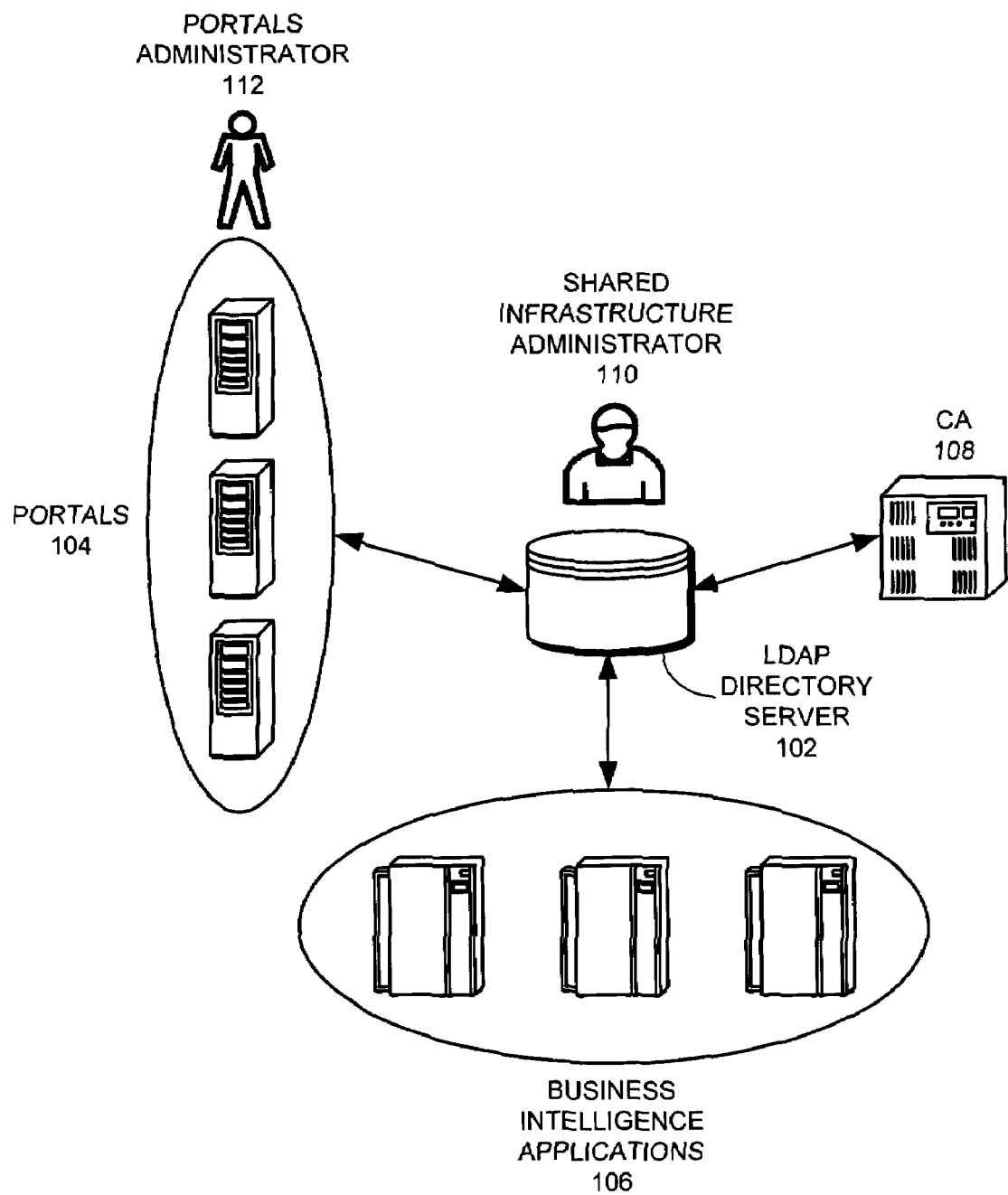
FIG. 1 illustrates a distributed-computing infrastructure that contains an LDAP directory server 102 which can be shared between various applications, such as, portals 104, business intelligence applications 106, and a CA (Certification Authority) 108 in accordance with an embodiment of the present invention.

FIG. 1 illustrates a distributed-computing infrastructure that contains an LDAP directory server 102 which can be shared between various applications, such as, portals 104, business intelligence applications 106, and a CA (Certification Authority) 108 in accordance with an embodiment of the present invention.

Note that a shared infrastructure, such as LDAP directory server 102, can be managed by the shared infrastructure administrator 110, while applications, such as portals 104, which use the LDAP directory, can be managed by another administrator, namely, the portals administrator 112.

Moreover, information in the shared infrastructure that is specific to an application, such as a business intelligence application, needs to be protected from other applications, such as a portal, since they both use the shared infrastructure to store data.

Presently, while deploying applications, administrators are typically granted high level privileges in the shared infrastructure. Moreover, an application's run-time privileges for accessing the shared infrastructure can potentially be very high.

This creates two problems. First, the administrators of the shared infrastructure must trust the application installers enough to grant them high level privileges. In a large enterprise, this may lead to a large number of installers having high privilege levels, which is undesirable due to obvious security reasons. Second, applications that have high privilege levels in the shared infrastructure can inadvertently corrupt shared data or gain access to data that should not have been accessible to these applications, which is also undesirable for obvious reasons. Because of these reasons it is difficult to achieve secure delegation.

Hence, what is needed is a method to grant privileges to installers and applications that are high enough for performing their respective tasks, but low enough, in accordance with the least privilege model, so that they don't cause the problems described above.

Roles and Delegation Model

The present invention solves these problems by using a role-based access control framework that achieves separation of duties. In particular, in the present invention, different roles (or tasks) can be assigned to users and applications which grant them privileges that are appropriate for their responsibilities.

Specifically, the present invention classifies roles into three broad categories: deployment roles, run-time roles, and admin roles.

Deployment roles allow an application to create their own metadata (at deployment time) in the shared infrastructure as well as grant the distributed application, a set of run-time roles, which are described below. Note that the set of run-time role(s) that a user is allowed to grant can depend on the deployment role that a user has been assigned. The deployment roles also allow users and applications to create new run-time and/or admin roles to further protect their data in the shared infrastructure.

Run-time roles allow a user or an application to perform specific operations in the shared infrastructure. Note that each run-time role can have a specific permission or privilege. For example, a "change password" run-time role can allow an application to change a user's password. Furthermore, note that a run-time role can be granted by a user or application that has the appropriate deployment role.

Admin roles allow a user or an application to perform administrative tasks. For example, an admin role can allow a user to administer user information and application security policies. This includes creating, editing, and deleting profiles for users and applications.

Note that a privilege can be delegated by simply assigning a role. For example, an admin for the shared infrastructure can simply assign an appropriate deployment role to a user, thereby delegating the deployment privileges and responsibility to the user.

Furthermore, in one embodiment of the present invention, a role is assigned for a fixed duration, after which the role is revoked. For example, a user may be assigned a deployment role only for the duration that the user is deploying an application, after which the role may be revoked thereby restricting user from doing any other installations subsequently.

Note that present techniques for delegation of privileges are typically limited to a single system and do not cross system boundaries. Due to the lack of a consistent enterprise-wide delegation model, existing implementations of shared infrastructures are complex and proprietary.

In contrast, the present invention allows administrators to delegate deployment responsibilities and ensures security of the common infrastructure. Moreover, the present invention protects an application's data from other applications within the shared infrastructure.

In one embodiment of the present invention, the assignment of roles to users and applications is maintained by a centralized repository in the distributed-computing infrastructure. Moreover, in one embodiment of the present invention, the centralized repository in the distributed-computing infrastructure uses LDAP (Lightweight Directory Access Protocol) directory service.

Note that the present invention uses a hierarchy of roles to allow deployment of applications based on the principal of "Least Privilege." Specifically, in a least privilege model, users and applications are given just the amount of privileges that they need to perform their responsibilities.

Deployment Roles

In one embodiment of the present invention, a deployment-role is assigned to a user, thereby enabling the user to deploy an application in the distributed-computing infrastructure and delegating to the user the privilege to assign a run-time-role to the application.

In one embodiment of the present invention, deployment roles are used for deploying an Oracle AS (Oracle Application Server) or OCS (Oracle Collaboration Suite) application in a distributed-computing infrastructure.

Table 1 presents an exemplary list of deployment roles, their tasks, and the associated permission.

TABLE 1

Exemplary deployment roles and their privileges.

| Deployment Roles | Deployment Tasks and Functions | Associated Permissions |
| --- | --- | --- |
| IAS Admin | Database registration; mid-tier installation; install IAS; grant run-time roles; setup provisioning profiles; register virtual services objects in service registry; grant service registry readers roles; assign "trusted applications" role. | Read user attributes; read group attributes; create groups; edit groups; delete groups; authenticate users; read application verifiers; service registry viewer; trusted application. |
| User Management Application Admin | Install specific applications which have interfaces to perform user management operations e.g. Portal, Wireless etc. | Create users; edit user attributes; delete user attributes. |
| Trusted Application Admin | Install identity management components, such as, SSO (Single Sign-On), DAS (Delegated Administration Services), and OCA (Oracle Certificate Authority). | Read, compare, or re-set user password; proxy as the end-user; read, compare or change the user's certificate and S/MIME (Secure Multipurpose Internet Mail Extensions) certificate. |
| OID Super User | All the privileges that an "IAS Admin" and a "Trusted Application Admin" have. | In addition to privileges of an "IAS Admin" and a "Trusted Application Admin", this role grants permission to assign an "IAS Admin" role or a "Trusted Application Admin" role to a user. |

Run-Time Roles

Run-time roles enable applications to acquire appropriate run-time permissions to function properly. For example, an application may require permission to read the time zone and the language information for a user. Similarly, another application may require the permission to read the first name, last name, and email address of a user. Recall that a deployment role grants a user or an application the privilege to assign a run-time role to another application.

In one embodiment of the present invention, a run-time role is assigned to an application, which grants permission to the application to access a resource in the distributed-computing infrastructure, thereby allowing the application to operate properly.

Table 2 presents an exemplary list of run-time roles, their associated deployment roles that have the privilege to grant the run-time roles, and the associated permissions.

TABLE 2

Exemplary run-time roles and their associated permissions.

| Run-time role | Deployment roles that allow a user to grant the run-time role | Associated permission |
| --- | --- | --- |
| Common User Attribute access | IAS Admin; OID Super-user | Read common user attributes. |
| Common Group Attribute access | IAS Admin; OID Super user | Read public groups. |
| Authentication Services | IAS Admin; OID Super-user | Authenticate users. |
| Verifier Services | IAS Admin; OID Super-user | Read and set application specific password verifiers. |
| User Proxy Privilege | Trusted Application Admin; OID Super-user | Act as a proxy for a user. |
| Trusted Applications | IAS Admin; OID Super-user | Determine the group of Trusted Applications. |
| Service Registry Viewers | IAS Admin; OID Super-user | Read information from Service Registry. |

Admin Roles

Admin roles can be used to manage information stored within the common infrastructure. For example, in one embodiment of the present invention, admin roles are used to mange information within OID. The permissions associated with these roles typically allow the user to administer user-information and application security policies. This includes creating new users, editing user profiles, deleting a user, creating groups, editing groups, changing user passwords etc.

Note that an application can create its own application-specific admin roles to manage information that is specific to the application. For example, the OCA (Oracle Certification Authority) application can create a PKI (Public Key Infrastructure) admin role for managing certificate related information that is stored in a shared infrastructure.

The following table presents an exemplary list of admin roles, the users that have the privilege to grant the admin roles, and the associated permissions.

TABLE 3

Exemplary admin roles and their privileges.

| Admin Role | Deployment roles that allow a user to grant the admin role | Associated Permissions |
| --- | --- | --- |
| Create User | User Management; Application Admin; OID Super-user | Create a new user. |
| Edit User | User Management; Application Admin; OID Super-user | Edit user attributes like first name, last name, telephone number etc. |
| Delete User | User Management; Application Admin; OID Super-user | Delete users. |
| Create Groups | IAS Admin; OID Super-user | Create public or private groups. |
| Edit Groups | IAS Admin; OID Super-user | Edit memberships of public groups. |
| Delete Groups | IAS Admin; OID Super-user | Delete public groups. |
| User Security Admin | Trusted Application Admin; OID Super-user | Read and update a user's password. |

TABLE 3-continued

Exemplary admin roles and their privileges.

| Admin Role | Deployment roles that allow a user to grant the admin role | Associated Permissions |
|---|---|---|
| Service Registry Admin | IAS Admin; OID Super-user | Change information in service registry. |
| PKI Admin | Trusted Application Admin; OID Super-user | Read, and update a user's PKI certificate or S/MIME certificate. |
| OID Schema Admin | OID Super-user | Administer LDAP Schemas. |

Role Owner

A user or an application can also have the privilege to assign a role to another user or application. Privilege delegation is implemented using the concept of a "role-owner". A "role-owner" of a role can assign the role to other users. Moreover, a user can be the "owner" of a "role-owner role". This allows the user to appoint another user as a "role-owner".

In one embodiment of the present invention, the system assigns a role-owner role that is based on an assignable-role to a role-owning-user, thereby enabling the role-owning-user to assign the assignable-role to users. Note that an assignable-role can be any role that can be assigned to a user. Deployment-roles, run-time-roles, and admin-roles are all examples of assignable roles. Moreover the deployment-role-owner role is also an assignable role.

Figure 2:
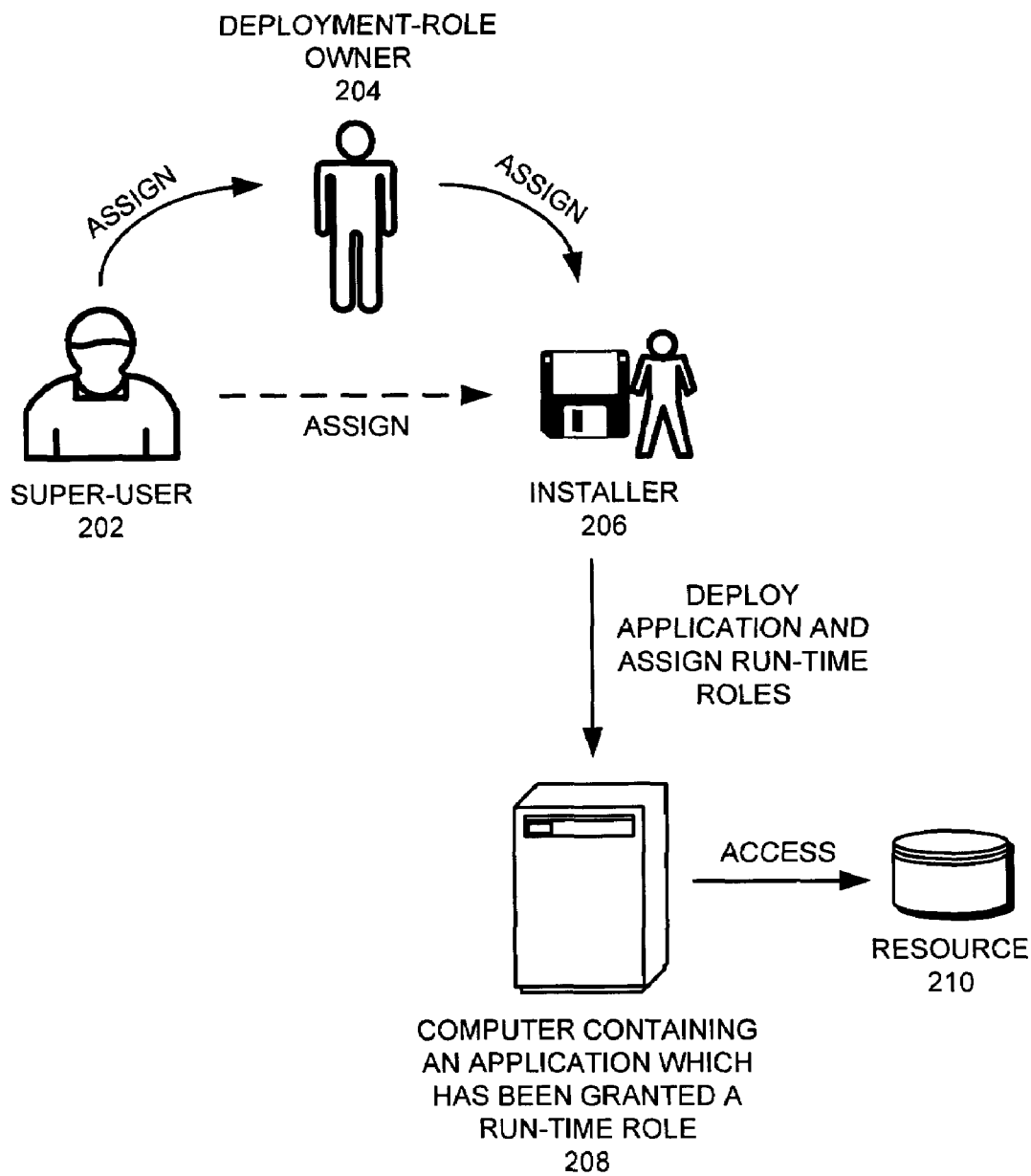
FIG. 2 illustrates the various types of roles in accordance with an embodiment of the present invention.

FIG. 2 illustrates the various types of roles in accordance with an embodiment of the present invention.

Specifically, in one embodiment of the present invention, the super-user 202 assigns the deployment-role-owner role to user 204. Next, the deployment-role owner 204 assigns the deployment role to installer 206. Note that super-user 202 can also directly assign the deployment role to installer 206 (this assignment operation is shown with a dotted line).

The installer then deploys and assigns run-times roles to an application on computer 208. Note that in a distributed-computing infrastructure, computer 208 can be a logical entity that represents a plurality of physical devices. Finally, the application on computer 208 accesses the resource 210 in the distributed-computing infrastructure using the run-time roles that were assigned to it by the installer 206.

Note that, since the present invention uses a hierarchical role-based model to delegate privileges, installers do not need be granted higher privilege levels than needed in the shared infrastructure for installing applications. Similarly, applications do not need to be assigned higher privilege levels than needed in the shared infrastructure for accessing resources during run-time. Furthermore, installers can be assigned the right privilege to assign the appropriate run-time privileges to applications.

Hence, by delegating to users the appropriate level of privilege to assign roles to applications simplifies the secure deployment and management of applications in the distributed-computing infrastructure.

Least Privilege Model

The present invention is based on the principal of "Least Privilege." Assigning different deployment and run-time roles ensures that users and applications have the minimum amount of privileges that are necessary to perform their operations. Consequently, the present invention identifies several run-time roles, each with a specific set of permissions.

In one embodiment of the present invention, a set of standard deployment and run-time roles and their associated permissions are pre-seeded, i.e., they are pre-configured. This saves time for the user, who would otherwise have to define a large number of roles from scratch. When an application is installed, the application seeks the correct set of run-time roles for itself.

Note that the hierarchy of deployment roles allows the system to delegate deployment responsibilities to users who have the least amount of privileges required to perform operations. For example, "IAS Administrator" is a least privileged deployment role which allows a user to assign a small set of least privileged run-times roles to applications. Specifically, the "IAS Administrator" role has just sufficient privileges to deploy components like Oracle Forms, Oracle Reports, Oracle Wireless. On the other hand, "Trusted Application Administrator" is the highest privileged deployment role, which is typically used to deploy components that require higher run-time privileges. For example, the "Trusted Application Administrator" can have just sufficient privileges to deploy SSO (Oracle Single Sign-On) or DAS (Oracle Delegated Administration Service).

Note that the deployments roles are truly hierarchical roles in that a user with a higher level role can perform the operations that a user with a lower level role can perform. For example, a "Trusted Application Administrator" role includes the privileges of the "IAS Administrators" role, since the "Trusted Application Administrator" is a higher level deployment role than the "IAS Administrator." Furthermore, note that the administration of deployment roles can itself be delegated to another user by assigning to the user an owner-role for a specific deployment role.

Process of Delegating Privileges

Figure 3:
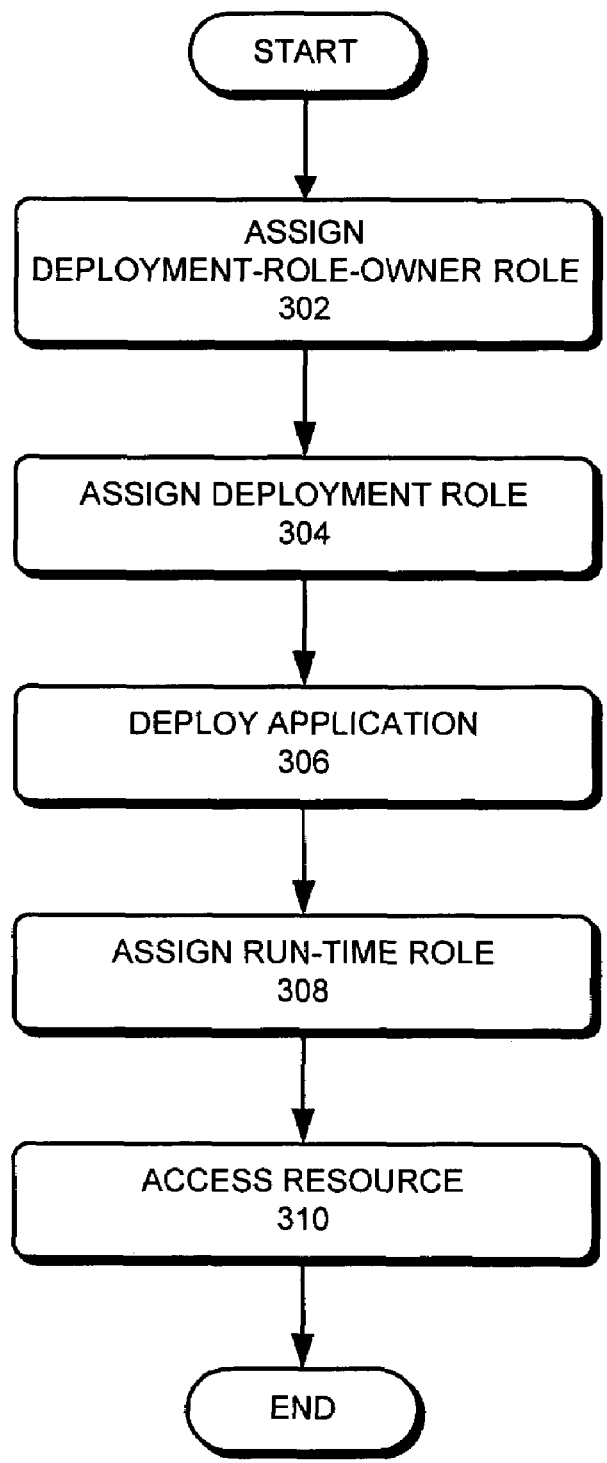
FIG. 3 presents a flowchart that illustrates the process of delegating privileges in a distributed-computing infrastructure in accordance to an embodiment of the present invention.

FIG. 3 presents a flowchart that illustrates the process of delegating privileges in a distributed-computing infrastructure in accordance to an embodiment of the present invention.

The process starts by assigning a deployment-role-owner role to a role-owning user (step 302). Note that assigning the deployment-role-owner role to the role-owning user delegates to the role-owning-user the privilege of assigning the deployment-role to other users.

Next, the role-owning user assigns a deployment role to another user (step 304).

The user then deploys (or installs) the application in the distributed-computing environment against a shared infrastructure (step 306).

Next, as part of the install, the application is also assigned run-time roles (step 308).

Finally, the application uses the permissions associated with the run-time role to access a resource in the shared infrastructure (step 310).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for securely deploying and managing applications in a distributed-computing environment over a shared infrastructure, the method comprising:
    assigning, by an assignor process residing on a computer, a deployment-role to a user, wherein the deployment-role enables the user to deploy an application in a distributed-computing environment over a shared infrastructure, wherein the deployment-role is associated with a run-time-role, and wherein the deployment-role is assigned for a duration that the user is deploying the application; and delegating, by a delegator process residing on the computer, to the user who is assigned the deployment-role, a privilege to assign the run-time-role associated with the deployment-role to the application, wherein the run-time-role is specific to the application and grants the application a permission associated with the run-time-role to access during run-time a resource in the shared infrastructure, thereby giving the application the minimum amount of access to the resource necessary for the application to operate properly in the shared infrastructure.

2. The method of claim 1, further comprising:
assigning a deployment-role-owner role to a role-owning-user, thereby delegating to the role-owning-user the privilege of assigning the deployment-role to the user.

3. The method of claim 1, further comprising:
assigning an admin-role to an admin-user, thereby enabling the admin-user to administer user information and application security policies.

4. The method of claim 1, further comprising:
assigning a role-owner role that is based on an assignable-role to a role-owning-user, thereby enabling the role-owning-user to assign the assignable-role to users.

5. The method of claim 1, wherein a role is assigned to the user for a limited duration only, wherein the role and associated privileges are revoked after the limited duration is over.

6. The method of claim 1, wherein the assignment of roles to users and applications is maintained using a centralized repository in the distributed-computing infrastructure.

7. The method of claim 6, wherein the centralized repository in the distributed-computing infrastructure uses LDAP (Lightweight Directory Access Protocol) directory service.

8. A computer-readable storage medium storing instructions that when executed by a computer cause the computer to perform a method for securely deploying and managing applications in a distributed-computing environment over a shared infrastructure, the method comprising:

assigning a deployment-role to a user, wherein the deployment role enables the user to deploy an application in a distributed-computing environment over a shared infrastructure, wherein the deployment-role is associated with a run-time-role, and wherein the deployment-role is assigned for a duration that the user is deploying the application; and delegating, to the user who is assigned the deployment-role, a privilege to assign the run-time-role associated with the deployment-role to the application, wherein the run-time-role is specific to the application and grants the application a permission associated with the run-time-role to access during run-time a resource in the shared infrastructure, thereby giving the application the minimum amount of access to the resource necessary for the application to operate properly in the shared infrastructure.

9. The computer-readable storage medium of claim 8, wherein the method further comprises assigning a deployment-role-owner role to a role-owning-user, thereby delegating to the role-owning-user the privilege of assigning the deployment-role to the user.

10. The computer-readable storage medium of claim 8, wherein the method further comprises assigning an admin-role to an admin-user, thereby enabling the admin-user to administer user information and application security policies.

11. The computer-readable storage medium of claim 8, wherein the method further comprises assigning a role-owner role that is based on an assignable-role to a role-owning-user, thereby enabling the role-owning-user to assign the assignable-role to users.

12. The computer-readable storage medium of claim 8, wherein a role is assigned to the user for a limited duration only, wherein the role and associated privileges are revoked after the limited duration is over.

13. The computer-readable storage medium of claim 8, wherein the assignment of roles to users and applications is maintained using a centralized repository in the distributed-computing infrastructure.

14. The computer-readable storage medium of claim 13, wherein the centralized repository in the distributed-computing infrastructure uses LDAP (Lightweight Directory Access Protocol) directory service.

15. A computer system for securely deploying and managing applications in a distributed-computing environment over a shared infrastructure, the computer system comprising:
a processor;
a memory;
a role-assigning mechanism configured to assign a deployment-role to a user, wherein the deployment-role enables the user to deploy an application in a distributed-computing environment over a shared infrastructure, wherein the deployment-role is associated with a run-time-role, and wherein the deployment-role is assigned for a duration that the user is deploying the application; and delegating, to the user who is assigned the deployment-role, a privilege to assign the run-time-role associated with the deployment-role to the application, wherein the run-time-role is specific to the application and grants the application a permission to access during run-time a resource in the shared infrastructure, thereby giving the application the minimum amount of access to the resource necessary for the application to operate properly in the shared infrastructure.

16. The computer system of claim 15, wherein the computer system further includes an owner-assigning mechanism configured to assign a deployment-role-owner role to a role-owning-user, thereby delegating to the role-owning-user the privilege of assigning the deployment-role to the user.

17. The computer system of claim 15, wherein the computer system further includes an admin-assigning mechanism configured to assign an admin-role to an admin-user, thereby enabling the admin-user to administer user information and application security policies.

18. The computer system of claim 15, wherein the computer system further includes a second role-assigning mechanism configured to assign a role-owner role that is based on an assignable-role to a role-owning-user, thereby enabling the role-owning-user to assign the assignable-role to users.

19. The computer system of claim 15, wherein the role-assigning mechanism is further configured to assign a role to the user for a limited duration only, wherein the role and associated privileges are revoked after the limited duration is over.

20. The computer system of claim 15, wherein the computer system further includes a centralized repository that maintains the assignment of roles to users and applications.

21. The computer system of claim 20, wherein the centralized repository uses LDAP (Lightweight Directory Access Protocol) directory service.

* * * * *